United States Patent
Bar et al.

(10) Patent No.: US 10,171,580 B2
(45) Date of Patent: Jan. 1, 2019

(54) GRANULAR INSTANT IMPORT OF REPLICATED VTL CARTRIDGE INTO A BACKUP CATALOG

(71) Applicant: INTERNATIONAL BUSINESS MACHINES CORPORATION, Armonk, NY (US)

(72) Inventors: Oren Bar, Rishon Lezion (IL); Joseph W. Dain, Vail, AZ (US); Elena Drobchenko, Raanana (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

(21) Appl. No.: 14/697,403

(22) Filed: Apr. 27, 2015

(65) Prior Publication Data
US 2016/0316010 A1 Oct. 27, 2016

(51) Int. Cl.
G06F 15/16 (2006.01)
H04L 29/08 (2006.01)
G06F 3/06 (2006.01)

(52) U.S. Cl.
CPC ...... H04L 67/1095 (2013.01); H04L 67/1097 (2013.01); G06F 3/0686 (2013.01)

(58) Field of Classification Search
CPC .................. H04L 67/1095; H04L 67/1097
USPC ........................................................ 709/219
See application file for complete search history.

(56) References Cited

U.S. PATENT DOCUMENTS

| | | | |
|---|---|---|---|
| 5,495,607 A | 2/1996 | Pisello et al. | |
| 5,608,865 A | 3/1997 | Midgely et al. | |
| 5,634,052 A | 5/1997 | Morris | |
| 6,269,431 B1* | 7/2001 | Dunham | G06F 11/1469 707/999.202 |
| 6,415,300 B1 | 7/2002 | Liu | |
| 6,611,923 B1 | 8/2003 | Mutalik et al. | |
| 7,631,213 B2 | 12/2009 | Johnson | |
| 7,814,338 B2 | 10/2010 | Johnson | |
| 8,386,733 B1 | 2/2013 | Tsaur et al. | |
| 8,675,296 B2 | 3/2014 | Amir et al. | |
| 9,495,382 B2* | 11/2016 | Agrawal | G06F 11/1451 |
| 2003/0041093 A1* | 2/2003 | Yamane | G06F 11/0709 709/201 |
| 2008/0243879 A1* | 10/2008 | Gokhale | G06F 11/1453 |
| 2009/0063410 A1 | 3/2009 | Haustein et al. | |
| 2009/0234892 A1* | 9/2009 | Anglin | G06F 11/1453 |
| 2009/0300409 A1* | 12/2009 | Bates | G06F 11/008 714/5.1 |
| 2010/0058013 A1* | 3/2010 | Gelson | G06F 11/1453 711/162 |
| 2011/0295797 A1* | 12/2011 | Akirav | G06F 17/30578 707/613 |

(Continued)

Primary Examiner — Vivek Srivastava
Assistant Examiner — Atta Khan
(74) Attorney, Agent, or Firm — Griffiths & Seaton PLLC (57) ABSTRACT

Methods, systems, and computer program product embodiments for cataloging data in a backup storage environment, by a processor device, are provided. In a storage system using tape library data replication between an originating site and one or more backup sites, data catalog data is replicated between the originating site and the backup site such that replicated data moved from the originating site to the backup site is placed into a catalog duplicative of the originating site.

12 Claims, 4 Drawing Sheets

(56) References Cited

U.S. PATENT DOCUMENTS

| | | | |
|---|---|---|---|
| 2012/0047338 A1* | 2/2012 | Akirav | G06F 11/1456 |
| | | | 711/162 |
| 2012/0221820 A1* | 8/2012 | Akirav | G06F 11/1456 |
| | | | 711/162 |
| 2013/0290474 A1* | 10/2013 | Therrien | H03M 7/3084 |
| | | | 709/216 |

* cited by examiner

GRANULAR INSTANT IMPORT OF REPLICATED VTL CARTRIDGE INTO A BACKUP CATALOG

BACKGROUND OF THE INVENTION

Field of the Invention

The present invention relates in general to computers, and more particularly to a method, system, and computer program product for the improved cataloging of replicated data at disaster recovery sites.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment.

SUMMARY OF THE DESCRIBED EMBODIMENTS

Various embodiments for cataloging replicated data in a backup storage environment are provided. In one embodiment, the method comprises, in a storage system using tape library data replication between an originating site and one or more backup sites, replicating catalog data between the originating site and the backup site such that replicated data moved from the originating site to the backup site is placed into a catalog duplicative of the originating site.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

With increasing demand for faster, more powerful and more efficient ways to store information, optimization of storage technologies is becoming a key challenge, particularly in tape drives. In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

Virtual storage components are found in a variety of computing environments. A typical virtual storage component is the magnetic tape cartridge used via a magnetic tape drive. Multiple tape drives may be contained in a tape library, along with several slots to hold tape cartridges. Such data storage systems utilize storage components (usually direct access storage, such as disk arrays) to virtually present tape libraries or tape drives. Both types of technologies are commonly used for backup and recovery purposes. Virtual tape libraries, which integrate with existing backup software and existing backup and recovery processes, enable typically faster backup and recovery operations. It is often required that such data storage entities be replicated from their origin site to remote sites. Replicated data systems may externalize various logical data storage entities, such as files, data objects, backup images, data snapshots or virtual tape cartridges.

Replicated data entities enhance fault tolerance abilities and availability of data. Thus, it is critical to create disaster recovery (DR) plans for these massive computer systems, particularly in today's global economy. DR plans are required by variable sized companies and by governments in most of the western world. Most modern standards denote a 3-4 sites (many-to-many) topology group for replicating data between the storage systems in order to maintain 3 to 4 copies of the data in the storage systems. Deduplication of data is often leveraged for these backup and replication operations.

Under the present state of the art, a single backup domain in a virtual tape cartridge may exist in a single virtual tape library (VTL) at a time. This is by design, and is consistent with the concepts of physical tape storage environments. As a result, in order to perform procedures related to disaster recovery (DR), an administrator must import cartridges into the VTL at the destination system (i.e. DR site), as well as import the backup database or catalog from one of the cartridges at the destination VTL.

The importation of these cartridges combined with restoring a backup database or catalog takes a measurable amount of time and overhead. Such time may not be practical in an actual disaster situation. For example, a system importing thousands of cartridges and the vast accompanying catalog may take several hours to complete.

Previous attempts to reduce this downtime have resulted in poor proprietary software solutions requiring costly additional systems to complete. An advantageous solution would require no additional hardware and only minimal changes to current VTL software solutions.

The present invention provides such an implementation. In once such embodiment, in a storage system using virtual tape library data replication that employs data reduction techniques such as data deduplication and data compression between an originating site and one or more backup sites, data catalog data is replicated between the originating site and the backup site such that replicated data moved from the originating site to the backup site is placed into a catalog duplicative of the originating site.

Figure 1:
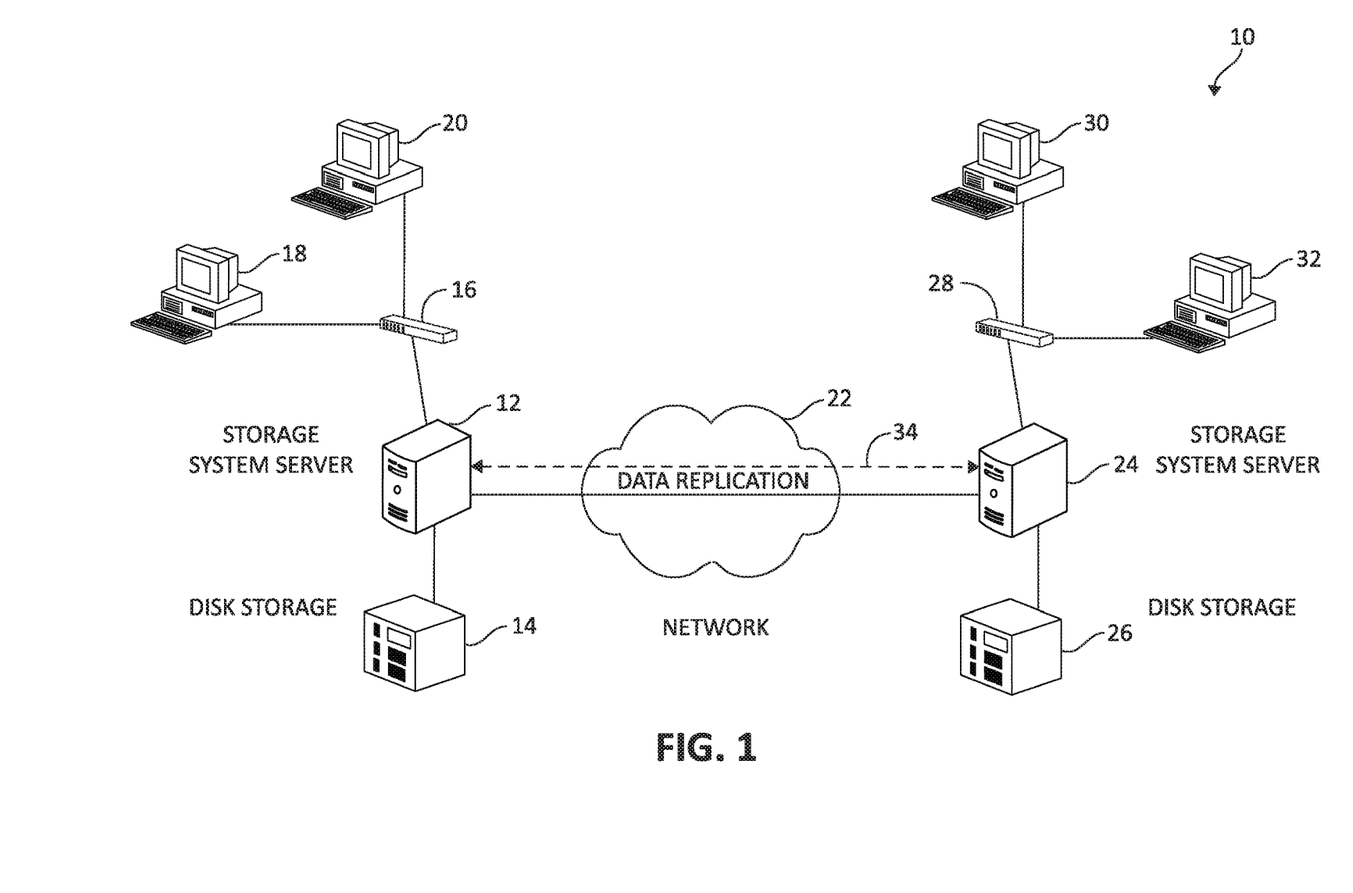
FIG. 1 illustrates an exemplary computing environment in which aspects of the present invention may be implemented.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a storage device 14 is connected to local hosts 18 and 20 over a network including components such as Fibre channel switch 16. Fibre channel switch 16 is capable, for example, of executing commands (such as small computer system interface (SCSI) commands) for tape devices. The skilled artisan will appreciate that architecture 10 may include a variety of storage components. For example, storage devices 14 may include conventional hard disk drive (HDD) devices, or may include solid state drive (SSD) devices.

Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. Network 22 may include a variety of network topologies, such as a wide area network (WAN), a local area network (LAN), a storage area network (SAN), and other configurations. Similarly, switches 16 and 28 may include other types of network devices.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10. For example, in one embodiment, the disk storage device 14 may be part of a deduplicated storage system, storing deduplicated and compressed data entities. The deduplicated and compressed data entities may then undergo a data replication process 34 whereby the deduplicated and compressed data entities are replicated on the remote disk storage device 26.

Figure 2:
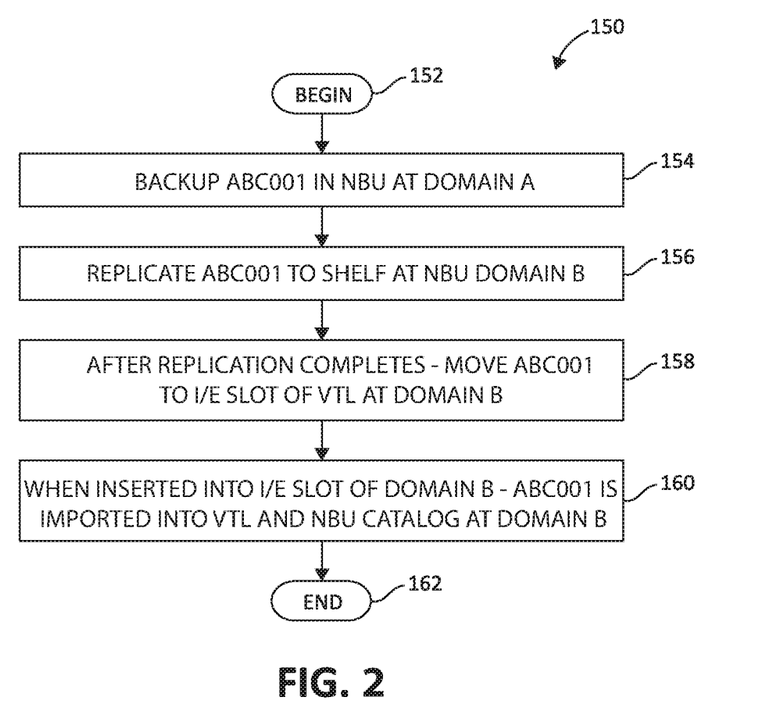
FIG. 2 illustrates a method according to one aspect of the present invention.

FIG. 2 illustrates a method 150 according to one aspect of the present invention which may be performed on such architectures as architecture 10. In one embodiment, the method begins at 152 and consists of backing up a volume, for example volume ABC001, with a system such as NetBackup (NBU) in an originating site (i.e. Domain A) 154. Volume ABC001 is then replicated to the shelf at NBU at the target site (Domain B) 156. After replication completes, ABC001 is moved to an import/export (I/E) slot of the VTL in Domain B 158. Once in the I/E slot, ABC001 is automatically imported into the VTL and NBU catalog at Domain B 160. The method ends at 162.

Figure 3:
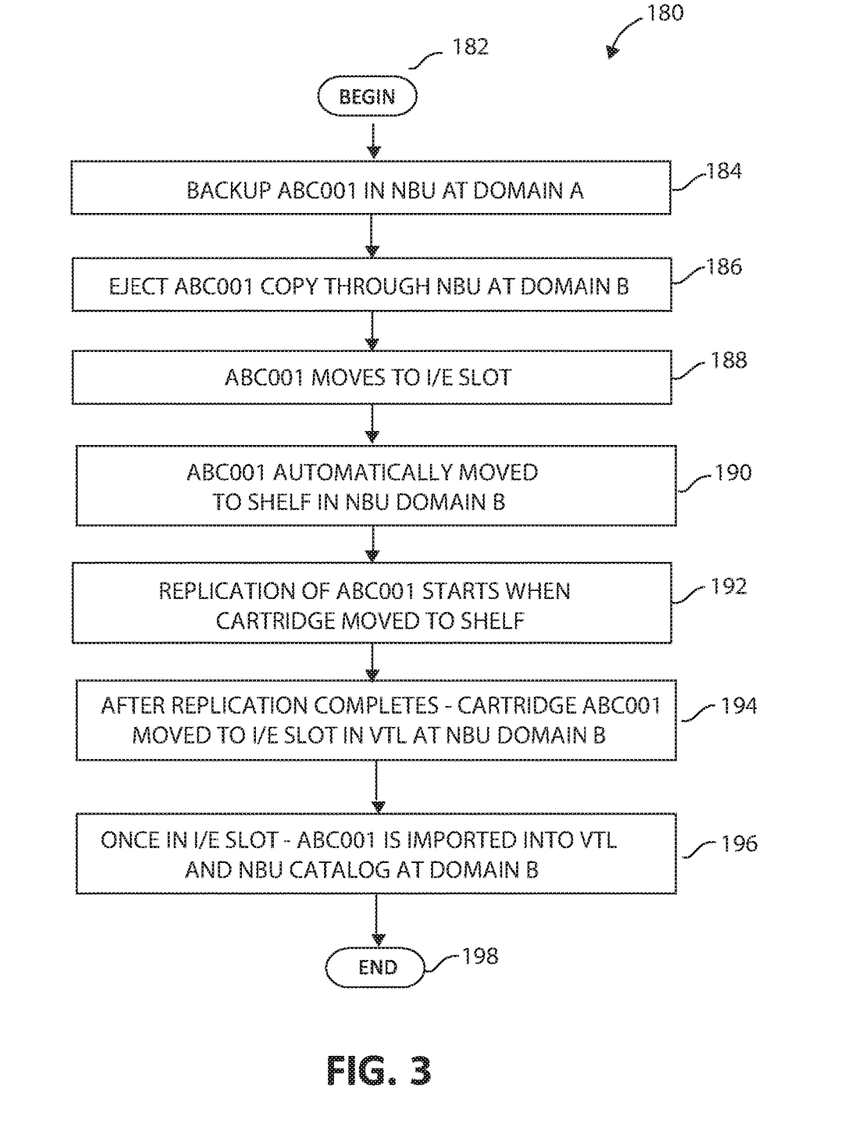
FIG. 3 illustrates an additional method according to one aspect of the present invention.

Similarly, FIG. 3 illustrates a method 180 according to another aspect of the present invention in which the coordination of appending data to cartridges via backup may then have the updates synchronized to the appropriate backup server catalog at the DR site. In one embodiment, the method begins at 182 and involves backing up a volume, for example ABC001, in a system such as NetBackup (NBU) at an originating site (i.e. Domain A) 184. Before starting the replication of ABC001 to the DR site (i.e. Domain B), a copy of ABC001 is ejected from the VTL through a system such as NBU at Domain B 186. The ejection of a cartridge from the VTL in Domain B causes ABC001 to move into an import/export (I/E) slot 188. ABC001 is then automatically shelved in NBU Domain B 190. Replication then begins of ABC001 when the cartridge has been shelved 192. After replication completes, cartridge ABC001 is then moved to an I/E slot in the VTL at NBU Domain B 194. Once in the I/E slot, ABC is automatically imported into the VTL and NBU catalog at Domain B 196. The method ends 198.

In one embodiment, note that the cartridge, in this case ABC001, remains in the catalog of the system (such as NBU) in Domain A throughout the aforementioned method processes. Additionally, note the aforementioned methods may be used and applied with multiple types of backup applications, NBU used specifically for the reason of example only. In this way, no further hardware is required for either method above to be achieved. The methods provided include mechanisms by which may be implemented by software or other means to keep the database or catalog live on the DR site, thereby eliminating precious time of recovery in an actual disaster.

Figure 4:
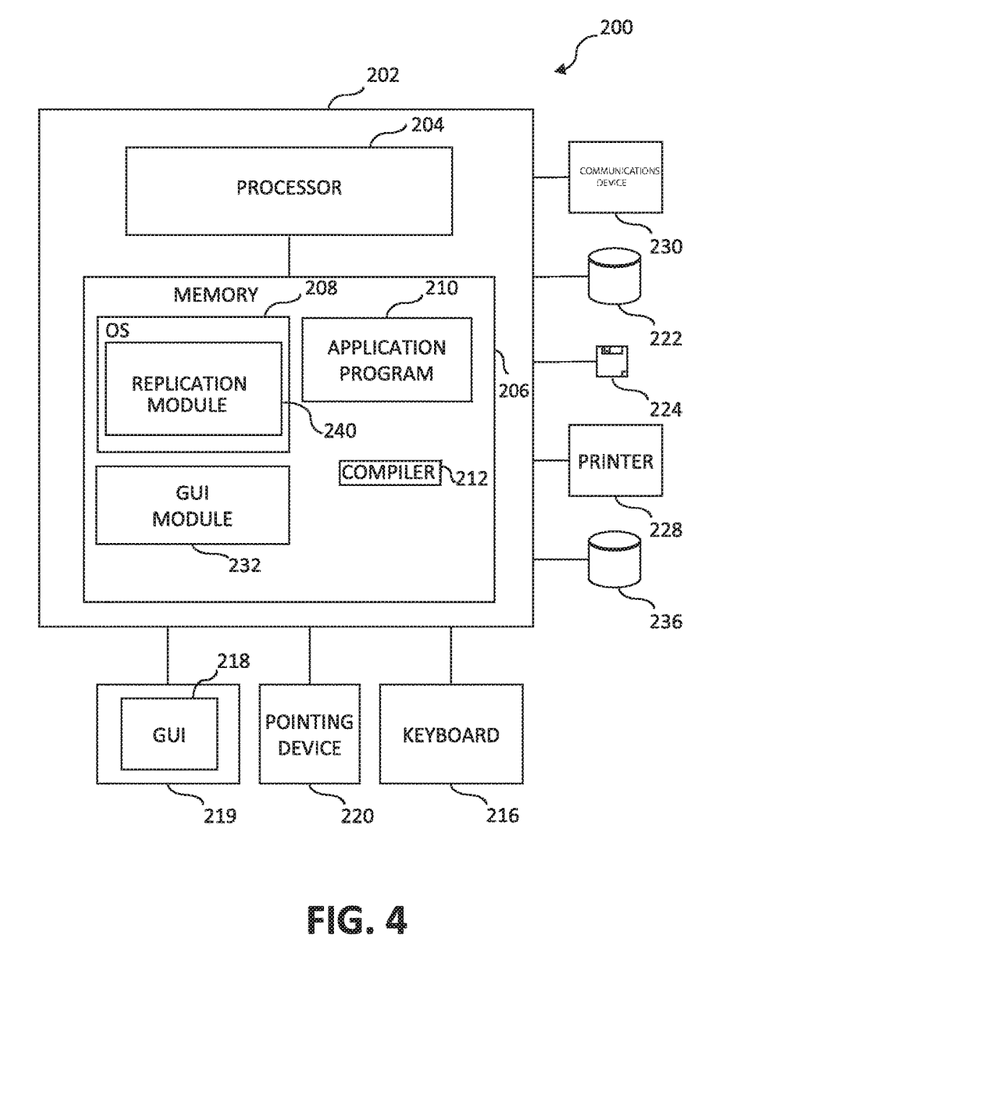
FIG. 4 illustrates an exemplary computing device including a processor device in a computing environment such as the computing environment shown in FIG. 1.

FIG. 4 hereafter provides an example of a portion of the computer environment 10 depicted in FIG. 1 in which the mechanisms of the foregoing embodiments may be implemented. It should be appreciated, however, that FIG. 4 is only exemplary and is not intended to state or imply any limitation as to the particular architectures in which the exemplary aspects of the various embodiments may be implemented. Many modifications to the architecture depicted in FIG. 4 may be made without departing from the scope and spirit of the following description and claimed subject matter.

FIG. 4 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240 which may be adapted for carrying out various processes and mechanisms in the exemplary embodiments previously described. Replication module 240 may be implemented in hardware, firmware, or a combination of hardware and firmware. In one embodiment, the replication module 240 may be embodied as an application specific integrated circuit (ASIC). As the skilled artisan will appreciate, functionality associated with the replication module 240 may also be embodied, along with the functionality associated with the processor 204, memory 206, and other components of computer 202, in a specialized ASIC known as a system on chip (SoC). Further, the functionality associated with the replication module (or again, other components of the computer 202) may be implemented as a field programmable gate array (FPGA).

As depicted in FIG. 4, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for cataloging replicated data in a backup storage environment, by a processor device, comprising:
in a storage system using tape library data replication between an originating site and a backup site, replicating catalog data between the originating site and the backup site such that replicated data moved from the originating site to the backup site is placed into a catalog duplicative of the originating site to efficiently import, at the backup site, the replicated data transferred from the originating site; wherein upon completion of initially replicating a volume of a cartridge from the originating site to the backup site such that the volume nor any data thereof has been previously replicated from the originating site to the backup site, the replicated data therein the replicated volume is automatically, and without user intervention, imported into the duplicative catalog of the backup site when the cartridge is moved to an import/export (I/E) slot of the tape library of the backup site in lieu of manually importing the catalog data to the backup site by an administrator, thereby mitigating time spent performing the replication and importation during a disaster recovery (DR) scenario; and
synchronizing appending catalog data by performing each of:
backing up the volume of the cartridge at the originating site;
prior to commencing replication for the replicated data of the volume from the originating site to the backup site, ejecting a copy of the cartridge through a backup application at the backup site; wherein the ejection includes moving the cartridge to the I/E slot of the tape library at the backup site;
responsive to detecting the cartridge is in the I/E slot, automatically shelving the cartridge in the backup application at the backup site;
commencing the replication for the replicated data of the replicated volume from the originating site to the backup site;
subsequent to completing the replication, moving the cartridge back to the I/E slot at the backup site, wherein, upon moving the cartridge back to the I/E slot, the replicated volume is automatically imported into the duplicative catalog of the backup site.

2. The method of claim 1, further including using an application programming interface (API) associated with the backup application to direct the data cataloging.

3. The method of claim 1, wherein the tape library data inclusive of the replicated data is stored in a virtual tape library (VTL).

4. The method of claim 3, wherein the replicated data is deduplicated data.

5. A system for cataloging replicated data in a backup storage environment, the system comprising:
a tape storage server operating at an originating site, a tape storage server operating at a backup site, and a processor device, controlling each storage server, wherein the processor device:

replicates catalog data between the originating site and the backup site such that replicated data moved from the originating site to the backup site is placed into a catalog duplicative of the originating site to efficiently import, at the backup site, the replicated data transferred from the originating site; wherein upon completion of initially replicating a volume of a cartridge from the originating site to the backup site such that the volume nor any data thereof has been previously replicated from the originating site to the backup site, the replicated data therein the replicated volume is automatically, and without user intervention, imported into the duplicative catalog of the backup site when the cartridge is moved to an import/export (I/E) slot of the tape library of the backup site in lieu of manually importing the catalog data to the backup site by an administrator, thereby mitigating time spent performing the replication and importation during a disaster recovery (DR) scenario; and synchronizes appending catalog data by performing each of:

backing up the volume of the cartridge at the originating site;

prior to commencing replication for the replicated data of the volume from the originating site to the backup site, ejecting a copy of the cartridge through a backup application at the backup site; wherein the ejection includes moving the cartridge to the I/E slot of the tape library at the backup site;

responsive to detecting the cartridge is in the I/E slot, automatically shelving the cartridge in the backup application at the backup site;

commencing the replication for the replicated data of the replicated volume from the originating site to the backup site;

subsequent to completing the replication, moving the cartridge back to the I/E slot at the backup site, wherein, upon moving the cartridge back to the I/E slot, the replicated volume is automatically imported into the duplicative catalog of the backup site.

6. The system of claim 5, wherein the processor device uses an application programming interface (API) associated with the backup application to direct the data cataloging.

7. The system of claim 5, wherein the tape library data inclusive of the replicated data is stored in a virtual tape library (VTL).

8. The system of claim 7, wherein the replicated data is deduplicated data.

9. A computer program product for cataloging replicated data in a backup storage environment by a processor device, the computer program product comprising a non-transitory computer-readable storage medium having computer-readable program code portions stored therein, the computer-readable program code portions comprising:

an executable portion that, in a storage system using tape library data replication between an originating site and a backup site, replicates catalog data between the originating site and the backup site such that replicated data moved from the originating site to the backup site is placed into a catalog duplicative of the originating site to efficiently import, at the backup site, the replicated data transferred from the originating site; wherein upon completion of initially replicating a volume of a cartridge from the originating site to the backup site such that the volume nor any data thereof has been previously replicated from the originating site to the backup site, the replicated data therein the replicated volume is automatically, and without user intervention, imported into the duplicative catalog of the backup site when the cartridge is moved to an import/export (I/E) slot of the tape library of the backup site in lieu of manually importing the catalog data to the backup site by an administrator, thereby mitigating time spent performing the replication and importation during a disaster recovery (DR) scenario; and an executable portion that synchronizes appending catalog data by performing each of:

backing up the volume of the cartridge at the originating site;

prior to commencing replication for the replicated data of the volume from the originating site to the backup site, ejecting a copy of the cartridge through a backup application at the backup site; wherein the ejection includes moving the cartridge to the I/E slot of the tape library at the backup site;

responsive to detecting the cartridge is in the I/E slot, automatically shelving the cartridge in the backup application at the backup site;

commencing the replication for the replicated data of the replicated volume from the originating site to the backup site;

subsequent to completing the replication, moving the cartridge back to the I/E slot at the backup site, wherein, upon moving the cartridge back to the I/E slot, the replicated volume is automatically imported into the duplicative catalog of the backup site.

10. The computer program product of claim 9, further including an executable portion that uses an application programming interface (API) associated with the backup application to direct the data cataloging.

11. The computer program product of claim 9, wherein the tape library data inclusive of the replicated data is stored in a virtual tape library (VTL).

12. The computer program product of claim 11, wherein the replicated data is deduplicated data.

* * * * *